No. 751,599. Patented February 9, 1904.

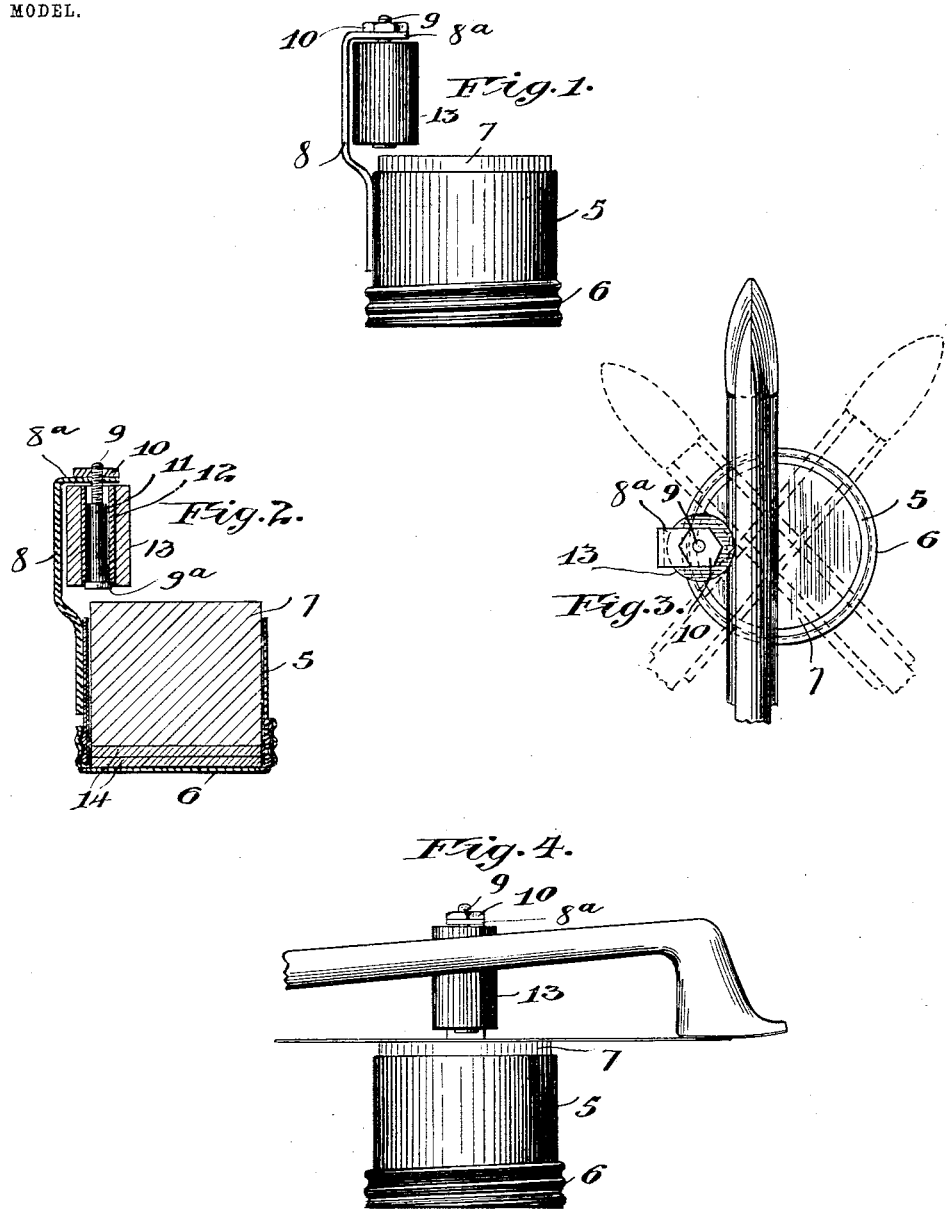

UNITED STATES PATENT OFFICE.

JOHN W. ZIMMERMAN, OF CHICAGO, ILLINOIS.

RESIN-DISTRIBUTER FOR VIOLIN-BOWS.

SPECIFICATION forming part of Letters Patent No. 751,599, dated February 9, 1904.

Application filed May 11, 1903. Serial No. 156,641. (No model.)

*To all whom it may concern:*

Be it known that I, JOHN W. ZIMMERMAN, a citizen of the United States, residing at Chicago, in the county of Cook and State of Illinois, have invented certain new and useful Improvements in Resin-Distributers for Violin-Bows, of which the following is a specification.

My invention relates to a simple, convenient, and effective device for applying resin to the bows of violins and similar stringed instruments that are played by the manipulation of a bow across the strings. An objection to the present means or method of applying resin to such articles resides in the fact that the bow is usually drawn across the surface of the resin stick or block in a single line or direction, thereby wearing in the latter a groove or furrow, which is usually somewhat narrower than the full width of the tension or hair member of the bow, whereby in applying the resin the hairs of the bow are contracted laterally or crowded close together, thus producing an uneven, unequal, and often insufficient distribution of resin over the hairs.

It is the object of my present invention to obviate the difficulty above noted, and this I accomplish through the provision of a combined resin-holder and bow-guide, whereby in applying the resin the rubbing-surface of the latter may always be maintained parallel with the normal plane of the hairs of bow, and whereby also the line or plane of contact of the hairs with the surface of the resin may be continually varied to produce a uniform wear on the surface of the resin and prevent the formation of grooves therein.

My invention in a preferred embodiment thereof is illustrated in the accompanying drawings, wherein—

Figure 1 is a side elevation of the device complete. Fig. 2 is a central vertical section therethrough. Fig. 3 is a top plan view illustrating the manner in which the device coöperates with the bow; and Fig. 4 is a front elevational view, also illustrating the coöperation of the bow therewith.

Referring to the drawings, 5 designates a metallic cylinder, which in coöperation with a bottom piece 6, adapted to screw on and cover the lower end thereof, constitutes a holder or receptacle for a block of resin 7. Secured to the side wall of the receptacle thus formed is a vertical standard or bracket 8, the upper end of which is bent horizontally and inwardly of the holder, as shown at $8^a$, and is apertured to receive the upper end of a depending spindle 9, which may be secured therein by a nut 10. Surrounding the spindle 9 is a bushing 11, which rests on the lower head $9^a$ of the spindle and constitutes a bearing for a sleeve or bushing 12, forming an inner metal lining for a roller 13, of rubber or other friction material.

The device is manipulated as follows: When it is desired to resin the bow, the latter and the resin-distributer above described are brought into coöperation, with the hairs of the bow lying flat upon and across the upper exposed surface of the resin block 7 and with the side of the back of the bow lying against the periphery of the roller 13. With the parts in this relation the device is moved to and fro longitudinally of the bow, or the bow may be drawn back and forth over the resin, and simultaneously with this relative movement between the parts the bow is given an angular movement relatively to the vertical axis of the resin block 7, as clearly indicated in dotted lines in Fig. 3, thereby preventing the formation of a groove in the upper surface of the resin and insuring a uniform wear of the upper surface of the resin block and also a thorough and uniform distribution of the resin upon the hairs of the bow. When the upper surface of the resin block has worn down to the level of the upper end of the casing or holder, the bottom piece 6 may be unscrewed and one or more disks of pasteboard or other space-filling material interposed to thereby raise the wearing-surface of the resin, such filling-disks being indicated at 14 in the drawings. The described construction of guiding-roller also enables the latter to be readily removed and replaced by a new friction-surface 13 as often as required.

It is evident that my invention might be considerably varied in respect to details of construction without departing from the principle thereof, which latter may be said to consist in the provision, in association with a block of resin, of means secured thereto and constituting a guide for the back of the bow, whereby the hairs of the latter may in the application of the resin be maintained in perfectly-flat sliding contact with the resin, and whereby also the angular position of the bow relatively to the resin may be varied without disturbing or interrupting such parallelism between the contacting surfaces of the resin and the bow. While I prefer to form the part to which the guide-roller 13 is attached and by which it is supported as a receptacle to contain the resin, yet is evident that the leading function of said receptacle resides in its character as a means to secure the guide-roller to the block of resin in a fixed relation to the upper or wearing surface of the latter.

I claim—

1. In a resin-distributer, the combination with a guide adapted to engage the back of the bow laterally thereof, of means whereby said guide may be secured to a block of resin with its bow-engaging surface projecting over and maintained in fixed relation to the wearing-surface of the latter, substantially as described.

2. In a resin-distributer, the combination with a resin-holder, of a guide secured thereto in fixed relation to and projecting over the wearing-surface of the resin and adapted to engage the side of the back of the bow in the operation of applying the resin to the latter, substantially as described.

3. In a resin-distributer, the combination with a resin-holder, of a bracket secured thereto and extending thereabove, and a guide-roller rotatably supported by said bracket in fixed relation to the wearing-surface of the resin and adapted to engage the back of the bow in the operation of applying the resin to the latter, substantially as described.

4. In a resin-distributer, the combination with a resin-holder, of a bracket secured thereto and extending thereabove and having its upper end bent horizontally inwardly of the holder, a spindle secured in the said inwardly-bent end of the bracket, and a guide-roller rotatably mounted on said spindle in fixed relation to the wearing-surface of the resin, substantially as and for the purpose described.

5. In a resin-distributer, the combination with a resin-holder having a removable bottom cover to facilitate the insertion of filling-pieces as the upper wearing-surface of the resin wears down, of a guide adapted to engage the back of the bow, and means whereby said guide is supported from said holder in fixed relation to the upper wearing-surface of the resin, substantially as and for the purpose described.

6. In a resin-distributer, the combination with a resin-holder having a removable bottom cover to facilitate the insertion of filling-pieces, of a bracket secured to and extending above said holder and having an inwardly-bent upper end, a spindle secured in and depending from said inwardly-bent upper end of the bracket, and a roller rotatably mounted on said spindle, substantially as described.

JOHN W. ZIMMERMAN.

Witnesses:
SAMUEL N. POND,
FREDERICK C. GOODWIN.